Aug. 8, 1950 — C. H. H. RODANET — 2,518,068
MOUNT FOR VARIOUS INSTRUMENTS,
SUCH AS MEASURING APPARATUS
Filed Dec. 19, 1945 — 4 Sheets-Sheet 1
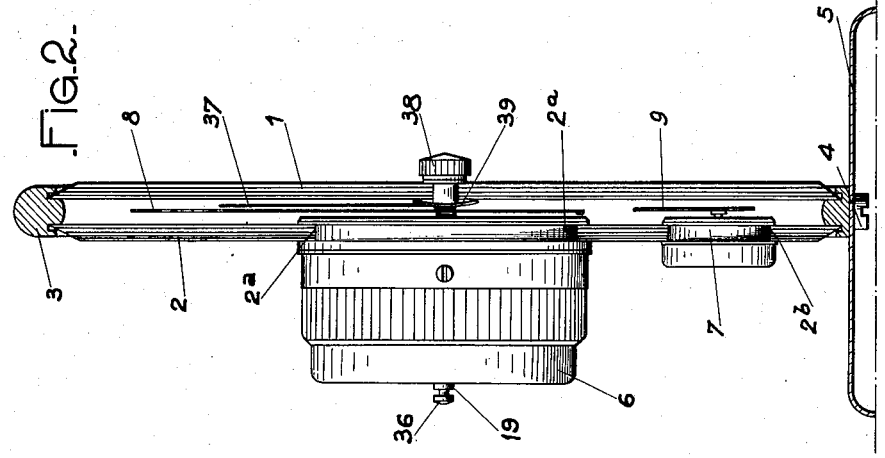
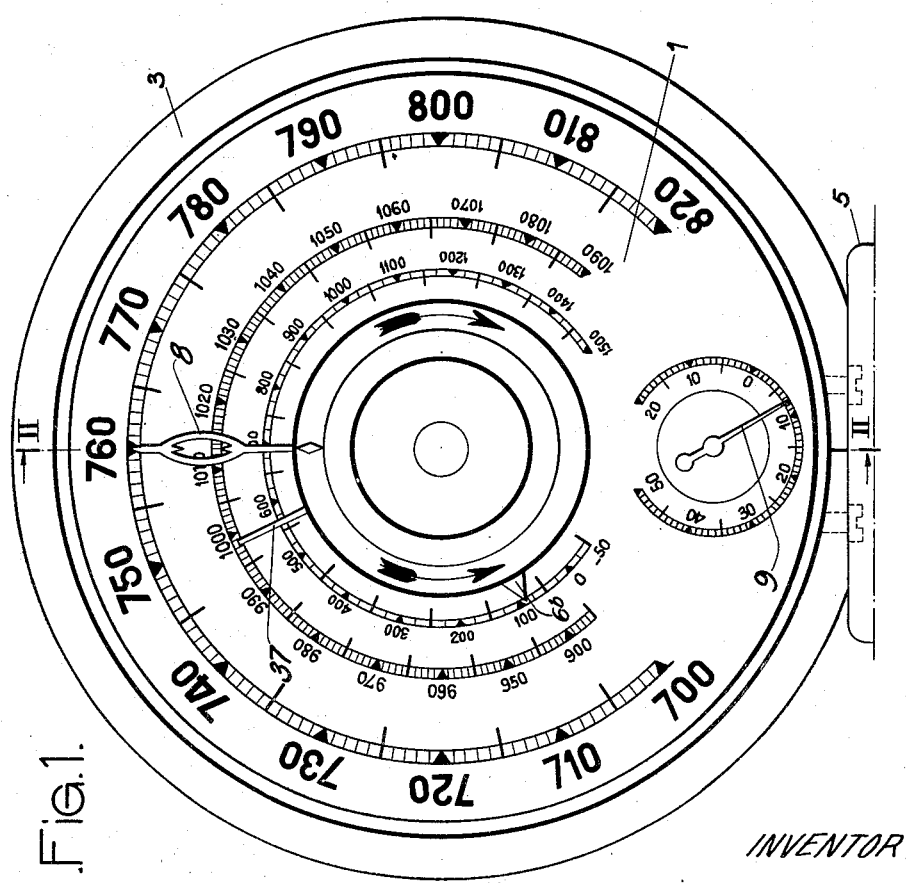
INVENTOR
CHARLES HILAIRE HENRI RODANET
BY Haseltine, Lake & Co.
AGENTS

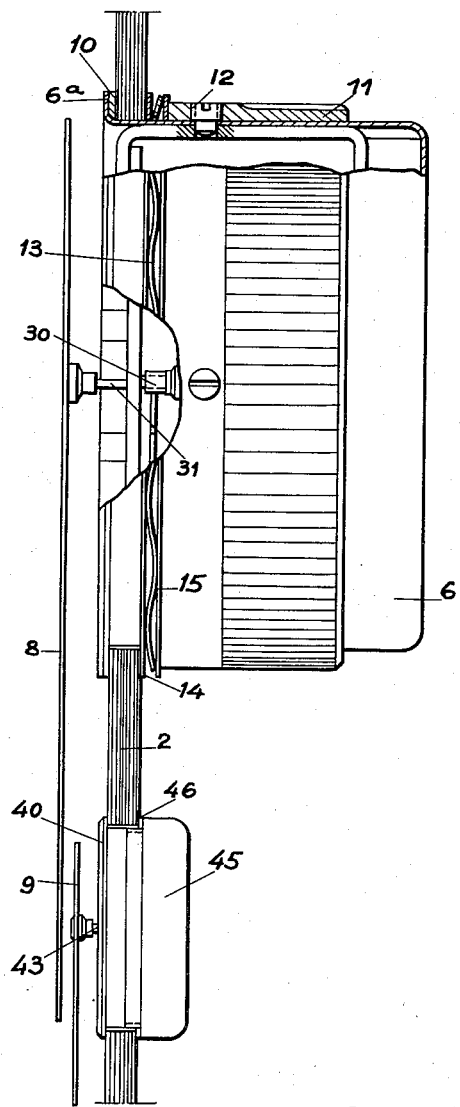

Aug. 8, 1950 — C. H. H. RODANET — 2,518,068
MOUNT FOR VARIOUS INSTRUMENTS, SUCH AS MEASURING APPARATUS
Filed Dec. 19, 1945 — 4 Sheets-Sheet 3
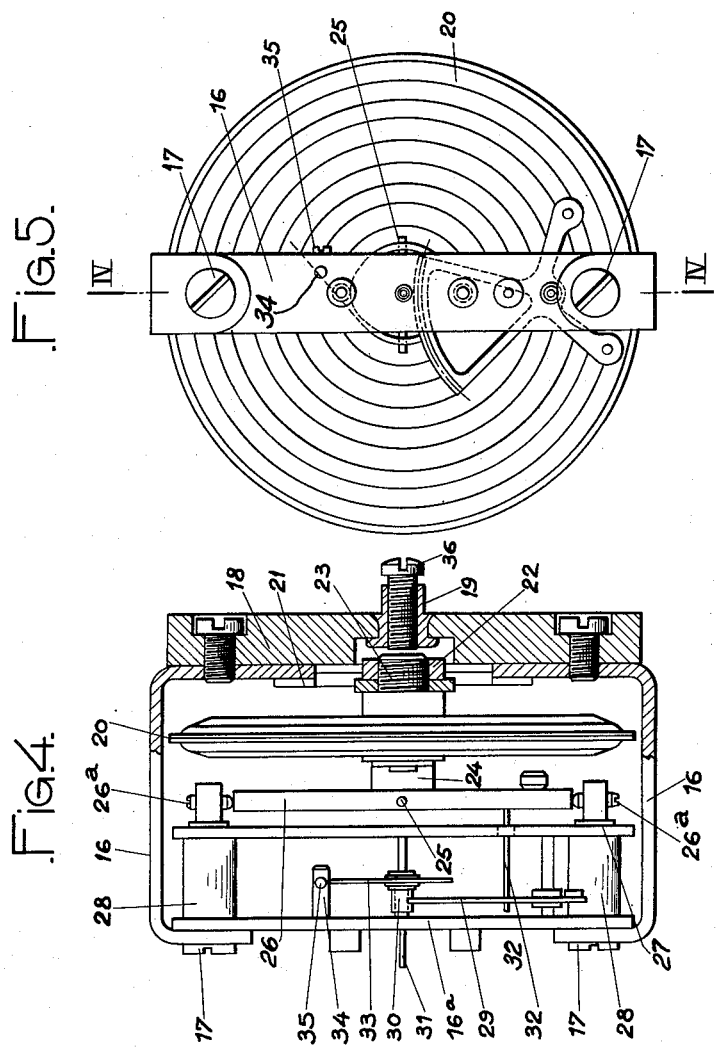
INVENTOR
CHARLES HILAIRE HENRI RODANET
BY Haseltine, Lake & Co.
AGENTS

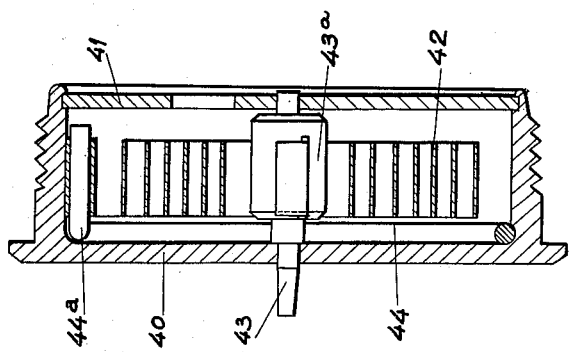
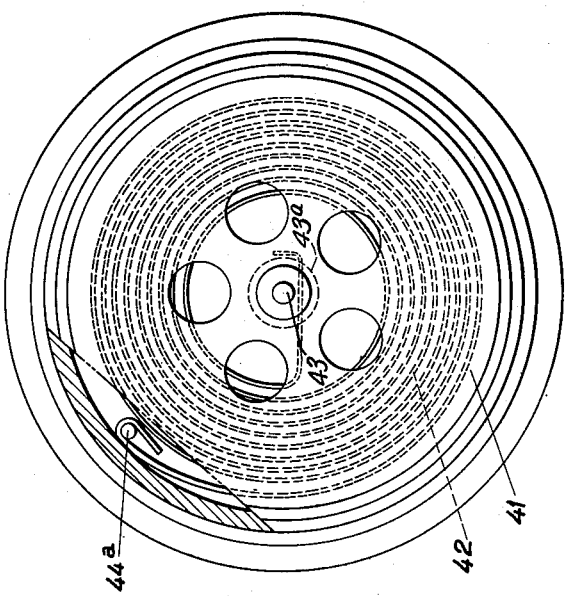

Patented Aug. 8, 1950

2,518,068

UNITED STATES PATENT OFFICE 2,518,068

MOUNT FOR VARIOUS INSTRUMENTS, SUCH AS MEASURING APPARATUS

Charles Hilaire Henri Rodanet, Neuilly-sur-Seine, France, assignor to Societe Anonyme Etablissements Ed. Jaeger Application December 19, 1945, Serial No. 635,948
In France January 10, 1945

10 Claims. (Cl. 73—431)

The present invention has for its object improvements in mounts for various instruments such for example as measuring instruments, and its purpose or industrial result is, on the one hand to simplify the mounting of devices of this kind, and on the other hand to improve the aesthetic effect. By way of example, it is particularly suitable as a combined mount for barometers and thermometers.

Other advantageous peculiarities of the invention will become apparent in the following description, taken with reference to the accompanying drawings which are given solely by way of example, and in which:

Fig. 1 is a front view of the whole arrangement mounted.

Fig. 2 is a corresponding left hand view in section along the line II—II of Fig. 1.

Fig. 3 is a detail view, on a larger scale than the previous views, of the mounting of the barometer case.

Fig. 4 is a view, on the same scale as the previous view, in section along the line IV—IV of Fig. 5, of the complete movement of the barometer.

Fig. 5 is a right hand view corresponding to Fig. 4.

Fig. 6 is a rear view, with partial cut-away portions of the thermometer case.

Fig. 7 is a left hand view corresponding to Fig. 6 in section.

According to the main characteristic of the invention the barometer mount comprises, for example, two bevelled glasses 1 and 2 arranged vertically and engaged in grooves provided in a keeper 3 of any desired cross-section, the two ends of which are held close together by means of screws 4 for fixing on a base 5.

In an advantageous form of construction, which is applicable each time it is required to make the movement of the instrument considered fluidtight, it is possible to mount the side walls 1 and 2 of the mount in the grooves of the keeper with the interposition at the bottom of said grooves of a gasket which is preferably resilient and which is formed, for example, by a rubber strip, for the purpose, furthermore, of preventing the breakage of the walls 1 and 2, if they are breakable, during the mounting of the mount.

The rear glass 2 is provided, on the one hand with a central cut-away portion 2a for supporting and centering the case 6 of the barometer, and on the other hand with a second cut-away portion 2b, placed on the same vertical axis as the first, for housing the case 7 of the thermometer.

The various usual graduations are provided on the inner face of the glass 2 concentrically to the spindle of the needles 8 and 9 of the barometer and of the thermometer, whereas the characters which indicate the variations of the atmospheric pressure, that is to say the increase or the decrease relatively to the normal pressure, are provided on the inner face of the front glass 1 of the mount.

The rotating case of the barometer comprises a deeply stamped member 6 made of any appropriate metal and, preferably of a light alloy. It is of circular cross-section and its edge located on the opposite side to the bottom is flanged outwardly at 6a to enable it to bear on the inner face of the rear glass 2, after the interposition of a friction washer 10 made of cellulose acetate or of any other material (Fig. 3).

The clamping of the case in the axial direction is effected by means of a ring 11 which is externally knurled so as to facilitate gripping it and which is engaged and fixed in the case by means of four headless screws 12 which also permit of the fixing of the frame 16 in which is mounted the barometer movement which will be described hereinafter.

The bearing of the ring 11 on the outer face of the glass 2 is effected through the intermediary of a corrugated washer 13 inserted between a cellulose acetate washer 14 abutting against the glass 2, and a washer 15, made for example of metal.

The corrugations of the resilient washer 13 are arranged in such a manner as to ensure its friction on the washers 14 and 15, substantially at opposite points, that is to say that the inclination of the generatrix of contact of each corrugation is reversed relatively to that of the following corrugation.

The barometer movement is mounted in a frame 16 which is assembled by means of screws 17 and is fixed on a support 18 carrying a tube 19 for centering it in a corresponding bearing surface of the case 6.

The deformable member, which is subjected to the variations of pressure, is an aneroid capsule 20 constructed in the usual manner and fixed by means of a nut 22 on a flexible blade 21 which is secured to the frame 16, said nut 22 being screwed on a threaded bearing surface 23 provided in the centre of the capsule and towards the rear of same.

On the front wall of the capsule 20 is fixed a right angle bracket 24 which bears against a lever 25 lodged in the medial part of a transverse spindle 26 which is vertically pivoted at both its ends on pivots formed by set screws 26a. Said set screws are carried by a plate 27 which is secured to the frame 16 by means of the screws 17, after the interposition of spacing washers 28.

The works of the movement which comprise a balanced quadrant 29 which meshes with a pinion 30 cut on the centre spindle 31 which carries the needle 8, are also pivoted, on the one hand on the plate 27 and on the other hand on the vertical connecting member or bridge 16a of the frame 16.

The transmission of the deformations of the aneroid capsule 20 to the balanced needle 8, which is shaped as shown in the drawings in such a manner as to enable the value of the atmospheric pressure to be read in millimeters of mercury and in millibars, is obtained by means of a lever 32, fixed at one end on the transverse spindle 26 in a direction perpendicular to the lever 25, and engaged at the other end between two arms provided in the quadrant 29, above the pivotal axis of said quadrant (Figs. 4 and 5).

The length and the relative position of the levers 25 and 32 are calculated so as to amplify the deformations of the capsule 20 for the purpose of increasing the sensitivity of the barometer. The constant retraction of the needle 8 of the latter is obtained by means of a spiral spring 33 fixed at one end on the spindle 31 and, at the other end on a projection 34, by means of a grub-screw 35.

A screw 36 engaged in a thread of the tube 19 and bearing on the surface 23 of the capsule 20, enables the barometer to be adjusted without taking it apart.

The reading of the pressures is effected in the following manner: In order to obtain the atmospheric pressure which is prevailing at any altitude, it suffices to act on the rotatable case 6 in such a manner as to place the pointer 6b provided on its flanged edge 6a opposite zero on the graduation in meters provided on the inner face of the glass 2 coaxially to the spindle 31 of the barometer. In the case in which it is desired, at a known altitude, to read on the barometer the pressure which exists at sea level, the pointer 6b is placed opposite the graduation corresponding to the altitude in question.

A pointer 37, pivoted on a pivot located in the extension of the spindle 31 of the barometer and supported by the front glass 1 of the barometer mount, is provided in the usual manner, in order to enable the variations of atmospheric pressure to be observed at two different times.

For this purpose, the pivot which carries the pointer 37 is provided with a knurled knob 38 on the outer side of the transparent wall 1, the axial immobilisation of the pointer being obtained by means of a domed washer 39 bearing on the inner face of the glass 1 (Fig. 2).

The thermometer movement, which is provided on the same vertical axis as the barometer and below same, is contained in a case 40 on which is crimped a bridge 41 (Figs. 6 and 7).

The spindle 43, which is pivoted in the vertical wall of the case 40 and in the bridge 41 and on which is fixed the needle 9, carries in its medial part a drum 43a to enable one of the ends of the spiral spring 42 to be crimped, the other end of said spring being fixed on the portion turned back at right angles 44a of resilient keeper 44 engaged in a groove of the cut-away portion of the case 40.

The thermometer is fixed on the barometer mount, after engagement of the case 40, which is externally threaded on its rear portion, in its housing provided on the rear glass 2 by means of a cover 45 after the interposition of a washer 46 made of any appropriate material (Fig. 3).

It is obvious that the embodiment illustrated and described is only given in an indicative and nonlimitative manner. In a general manner, all modifications or variants which in no way change the main characteristics hereinbefore explained or the purpose pursued, remain included in the scope of the present invention.

What I claim as my invention and desire to secure by Letters Patent is:

1. A mount for measuring instruments and the like, comprising a base, a resiliently deformable keeper having therein a transverse break and at least one internal groove, a wall engaged by its periphery in said groove means for connecting a measuring instrument on said wall, and means for fixing said keeper on said base and for holding the two ends of said keeper close together.

2. A mount for measuring instruments and the like, comprising a base, a resiliently deformable keeper of substantially circular shape having therein a substantially radial transverse break and at least one internal peripheral groove, a wall formed by a disc made of transparent material and engaged by its periphery in said groove keeper, means for connecting at least one measuring instrument on the wall of said mount, and means for fixing said keeper on said base and for holding the two ends of said keeper close together.

3. A mount for measuring instruments and the like, comprising a base, a resiliently deformable keeper of substantially circular shape having therein a substantially radial transverse break and two internal peripheral grooves, two side walls formed by a disc of transparent material such as glass, and engaged by its periphery in said groove of the keeper, a circular gasket made of any suitable material such as rubber and interposed between the periphery of said wall of the mount and the corresponding groove of the keeper in which said wall engages peripherally, means for connecting measuring instruments mounted on the rear wall of said mount, and means for fixing said keeper on said base and for holding the two ends of said keeper close together.

4. A mount for measuring instruments and the like, comprising a base, a resiliently deformable keeper of substantially circular shape having therein a substantially radial transverse break and two internal, spaced, parallel, peripheral grooves, a rear wall formed by a disc made of a transparent material such as glass, engaged in the rear groove of said keeper and provided with at least one circular perforation adapted to receive a measuring instrument, at least one outer case surrounding said measuring instrument at the periphery and on the rear part thereof, said case engaging in said perforation of said rear wall of said mount, means for holding said case in said perforation, a front wall formed by a disc of transparent material such as glass and engaged in the front groove of said keeper, the front of the instrument being viewable through said front wall, and means for fixing said keeper on said base and for holding the two ends of said keeper close together in order to fix said front and rear walls in mutual spaced relationship in the respective grooves of said keeper.

5. A mount for measuring instruments and the like, comprising a base, a resiliently deformable keeper of substantially circular shape having therein a substantially radial transverse break and two internal, spaced, parallel, peripheral grooves, a rear wall formed by a disc made of transparent material such as glass engaged in the rear groove of said keeper and provided with at least one circular perforation adapted to receive a measuring instrument, at least one external case surrounding each of said measuring instruments at the periphery and on the rear part thereof, said case engaging in said perforation of the rear wall of said mount, a peripheral outwardly flanged edge provided on the front part of said case and adapted to bear, when the case is engaged in the perforation, on the inner or front face of said rear wall of said mount, a removable ring mounted and fixed on said case and adapted to bear on the outer or rear face of said rear wall and thereby clamp said wall against said flanged edge of the case, a front wall formed by a disc of transparent material such as glass and engaged in the front groove of said keeper, the front of the instrument being viewable through said front wall, and means for fixing said keeper on said base and for holding the two ends of said keeper close together in order to fix said front and rear walls in mutual spaced relationship in the respective groove of said keeper.

6. A mount for measuring instruments and the like, comprising a base, a resiliently deformable keeper of substantially circular shape having therein a substantially radial transverse break and two internal, spaced, parallel, peripheral grooves, a rear wall formed by a disc made of transparent material such as glass, engaged in the rear groove of said keeper and provided with at least one circular perforation adapted to receive a measuring instrument, a circular gasket made of any suitable material such as rubber interposed between the periphery of said rear wall of the mount and the corresponding rear groove of the keeper, at least one outer case adapted to surround the measuring instrument at its periphery and on its rear part, said case engaging in said perforation of the rear wall of said mount, a peripheral outwardly flanged edge provided on the front part of said case and adapted to bear, when the case is engaged in the perforation, on the inner or front face of said rear wall of said mount, a removable ring mounted and fixed on said case and adapted to bear on the outer or rear face of said rear wall and thereby clamp said wall against said flanged edge of the case, two friction rings interposed respectively the one between said rear wall of the mount and, said flanged edge of said case, and the other between said rear wall and said removable ring mounted on the case, a front wall formed by a disc of transparent material such as glass and engaged in the front groove of said keeper, the front of the instrument being viewable through said front wall, a circular gasket made of any suitable material such as rubber interposed between the periphery of said front wall of said mount and the corresponding front groove of the keeper, and means for fixing said keeper on said base and for holding the two ends of said keeper close together in order to fix said front and rear walls in mutual spaced relationship in the respective grooves of said keeper.

7. A mount for measuring instruments and the like, comprising a base, a resiliently deformable keeper of substantially circular shape having therein a substantially radial transverse break and two internal, spaced, parallel, peripheral grooves, a rear wall formed by a disc made of transparent material such as glass, engaged in the rear groove of said keeper and provided with a plurality of circular perforations each adapted to receive a measuring instrument and with suitable graduations concentric with the edge of said perforations, a circular gasket made of any suitable material such as rubber interposed between the periphery of said rear side wall of the mount and the corresponding rear groove of the keeper, a plurality of outer cases each adapted to surround one of the measuring instruments at the periphery and on the rear part thereof, each of said cases engaging in one of said perforations of the rear wall of said mount, a peripheral outwardly flanged edge provided at the front part of each of said cases and adapted to bear, when the case is engaged in the corresponding perforation of said rear wall, on the front face of said wall, a removable ring mounted and fixed on each of said cases and adapted to bear on the outer or rear face of said rear wall and thereby clamp said wall against said flanged edge of the corresponding case in order to hold same, a resilient washer interposed between said removable ring and the outer face of said rear wall, friction rings interposed respectively between said resilient washer and the removable ring, between said resilient washer and the rear side wall and between said rear wall and the flanged edge of said case, an indicating needle driven by each of said measuring instruments and adapted to move opposite the graduation or graduations provided on the inner face of said rear side wall of the mount, a front wall formed by a disc of transparent material such as glass and engaged in the front groove of the keeper, the front of the instrument being viewable through said front wall, a circular gasket made of any suitable material such as rubber interposed between the periphery of said front wall of the mount and the corresponding front groove of the keeper, and means for fixing said keeper on said base and for holding the two ends of said keeper close together in order to fix said front and rear walls in mutual spaced relationship in the respective grooves of said keeper.

8. A mount according to claim 7, wherein a pointer is provided at the front end of the case of at least one of the measuring instruments and projects over the front face of the rear wall of said mount opposite a graduation provided thereon, said case being rotatable inside the perforation provided in the rear wall of said mount, whereby the calibration of the instrument is obtained with respect to the graduations provided on said rear wall opposite which the indicating needle of said measuring instrument moves.

9. A mount according to claim 7, wherein at least one pointer is pivoted in the front wall on the rear face thereof, in the extension of the pivotal axis of the indicating needle of at least one of the measuring instruments whereby a comparison may be made of the readings given by said indicating needle at any times.

10. A mount for measuring instruments and the like, comprising a base, a resiliently deformable keeper of substantially circular shape having therein a substantially radial transverse break and two internal, spaced, parallel, peripheral grooves, said keeper being provided, at each of the ends thereof adjacent the break, with a tapped perforation adapted to register with performations provided in said base, screws passing through the perforations of said base and adapted to screw into the tapped perforations of the keeper to secure said keeper to said base and hold the two ends of said keeper close together, a rear wall formed by a disc of transparent material such as glass engaged in the rear groove of said keeper and provided with a plurality of circular perforations each adapted to receive a measuring instrument and with suitable graduations concentric with the edge of said perforations, a circular gasket made of any suitable material such as rubber interposed between the periphery of said rear wall of the mount and the corresponding rear groove of the keeper, a plurality of outer cases each adapted to surround one of the measuring instruments at the periphery and on the rear part thereof, each of said cases engaging in one of said perforations of the rear wall of said mount, a peripheral outwardly flanged edge provided at the front part of each of said cases and adapted to bear, when the case is engaged in the corresponding perforation of said rear wall, on the front face of said wall, a pointer provided on said flanged edge and located opposite the graduation adjacent the edge of the corresponding perforation provided in said rear wall, said case being rotatable in said perforation, whereby said pointer can be brought into any desired position on said graduation, a removable ring mounted and fixed on each of said cases and adapted to bear on the outer face of said rear wall and thereby clamp said rear wall against said flanged edge of the corresponding case so as to hold same, a resilient washer interposed between said removable ring, and the outer face of said rear wall, friction rings interposed respectively between said resilient washer and the removable ring, between said resilient washer and the rear wall and between said rear wall and the outwardly flanged edge of said case, an indicating needle driven by each of said measuring instruments and adapted to move opposite the graduation or graduations provided on the inner face of said rear side wall of the mount, a front wall formed by a disc of transparent material such as glass and engaged in the front groove of said keeper, the front of the instrument being viewable through said front wall, a circular gasket made of any suitable material such as rubber interposed between the periphery of said front wall of the mount and the corresponding front groove of the keeper, at least one pointer arranged opposite the rear face of said front wall and pivoted in a perforation of said front wall located in the extension of the pivotal axis of the indicating needle of at least one of the measuring instruments, and an actuating knob secured to said pointer and projecting on the outside of said front wall so as to enable said pointer to be brought by hand into any desired position, thereby to enable a comparison to be made of the readings given by said indicating needle at any times.

CHARLES HILAIRE HENRI RODANET.

REFERENCES CITED

The following references are of record in the file of this patent:

UNITED STATES PATENTS

| Number | Name | Date |
|---|---|---|
| 2,030,487 | Whitehead | Feb. 11, 1936 |